June 27, 1967     D. A. PRUETER     3,327,551

BALL RETURN MEANS FOR BALL NUT AND SCREW MEANS

Filed March 12, 1965

INVENTOR.
Donald A. Prueter
BY
a. M. Neiter
ATTORNEY 3,327,551
BALL RETURN MEANS FOR BALL NUT
AND SCREW MEANS
Donald A. Pruefer, Saginaw, Mich., assignor to General
Motors Corporation, Detroit, Mich., a corporation of
Delaware
Filed Mar. 12, 1965, Ser. No. 439,264
19 Claims. (Cl. 74—424.8)

This invention relates to devices having a pair of members movable relative to each other on antifriction elements guided by a traveling finite raceway and more particularly to return means for returning the antifriction elements from one end of the raceway to the other end to provide for antifriction element recirculation.

Devices of this type are found, for example, in the ball nut and screw and ball spline art, which devices have traveling finite raceways for guiding an endless train of antifriction balls between their relatively movable nut and screw or male and female spline members. To enable the use of an endless train of balls, it is necessary to return the balls from one end of the raceway to the other end to provide for ball recirculation, the direction of ball return being dependent on the relative directional movement between the relatively movable inner and outer members.

One common way of returning the balls is to provide a return tube secured to the outer periphery of the outer member, which return tube is bent at its ends to extend through accommodating holes in the outer member to meet with the raceway. Such a structure, while being generally satisfactory, can impose undue restrictions in its application because of the additional radial space occupied by the return tube and because of the possibility of damage to the return tube such as by denting or crushing, which damage may render the device inoperative. Furthermore, the accommodating return tube holes must be located precisely which, together with the requirement of securing the return tube accurately in place with securing means such as a clamp, raise the cost factor.

Other ways have been proposed to effect the recirculation of the balls to meet the objections to the externally mounted return tube. For example, one approach has been to provide a return passageway through the interior of one of the relatively movable members instead of having the balls led outwardly to a return tube. Here too the difficulty and the expense of providing such a passageway with the necessary curvature internally of one of the members is apparent. Another attempt to decrease the difficulty and expense of manufacturing was in the provision of a ball return passageway between the inner and outer members, which passageway was provided by a channel in one of the members or complementary channels in both the members, which passageway unloaded the balls for their conveyance to either end of the raceway. This simplified manufacture of the structure but the balls were called on to negotiate a tight turn in traveling between the raceway and return passageway, which turn is less easily made than a more gradual turn.

The principle of this invention lies in the provision of a return tube molded in place in what will be described as a crossover or guide element. Deflector fingers for deflecting the balls to and from a loaded raceway, to and from the return tube are formed as part of the guide element, which deflector fingers are connected by smooth, curved entranceways to the opposite ends of the return tube. The present invention is illustrated as being adapted for use in a ball nut and screw assembly whose nut and screw members have complementary helical grooves providing a ball raceway. For this application, a groove is provided in the interior wall of the nut to receive the guide element, the groove being axially extending to locate the return tube parallel with the nut axis and the deflector fingers projecting a sufficient extent into the raceway for ball deflection. The guide element is grooved to complement the screw groove in the absence of the nut groove to maintain the continuity of the raceway and with the balls placed in the continuous ball circuit thus provided, the guide element is self-retaining through ball engagement.

An object of this invention is to provide new and improved transfer means for transferring antifriction elements from one end of a traveling finite raceway to the other end.

Another object of this invention is to provide transfer means for transferring antifriction elements from one end of a traveling finite raceway to the other end having a return tube encased in a guide element which has deflector fingers connected by smooth, curved entranceways to the opposite ends of the return tube passage.

Another object of this invention is to provide a return tube for transferring antifriction elements from one end of a raceway to the other end molded in place in a guide element having integral deflector fingers for deflecting the antifriction elements to and from the raceway, to and from the return tube.

Another object of this invention is to provide in an antifriction element recirculating mechanism an antifriction element transferring means for transferring the antifriction elements from one end of a raceway to the other end having a guide element and a return tube having curved ends molded in place in the guide element, which guide element has deflector fingers and smooth, curved passageways connecting the ends of the raceway to meet with the curved ends of the return tube.

Another object of this invention is to provide in a device having an inner member and an outer member encircling the inner member with the inner and outer members having complementary grooves providing a raceway for an endless train of balls, a return means including a guide element having a return tube molded in place, which guide element has deflector fingers to deflect the balls to and from the return tube, to and from the raceway, the guide element being located in an accommodating groove in one of the members and being grooved to provide continuity to the one member's ball groove, the guide element operatively cooperating with the other member to be retained in place on the one member.

These and other objects of the invention will be more apparent from the following description and drawing in which.

Figure 1:
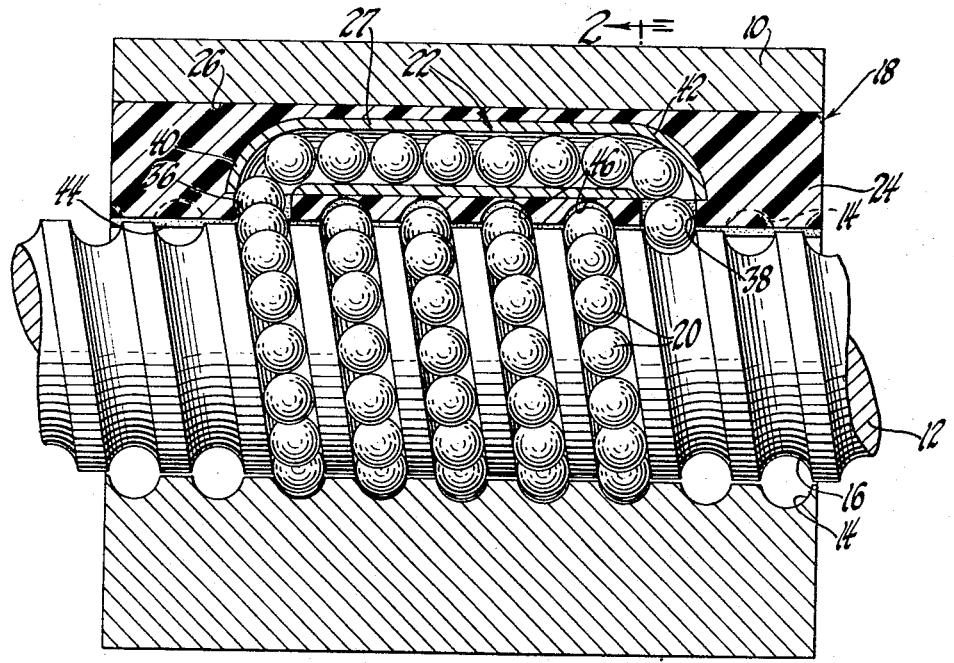
FIGURE 1 is a longitudinal view with parts in section showing a ball nut and screw assembly provided with antifriction element return means constructed according to this invention.

Referring to the drawing, in FIGURE 1 the antifriction element return means is illustrated as being adapted for use in a ball nut and screw assembly, which assembly has a nut member 10 and a screw member 12 having complementary helical ball grooves 14 and 16 respectively providing a helical raceway. An antifriction element return assembly generally designated at 18 determines and connects the opposite ends of the travelable finite helical raceway to complete an endless ball circuit for an endless train of balls 20, which return assembly will be described in detail subsequently. As is well understood in the ball nut and screw art, if one of the members 10 and 12 is held against axial movement and is free to be rotated relative to the other, such other member will be caused to move linearly if restrained against rotary movement through the helical drive provided by the balls 20 as they travel under loaded conditions in the helical raceway.

Figure 3:
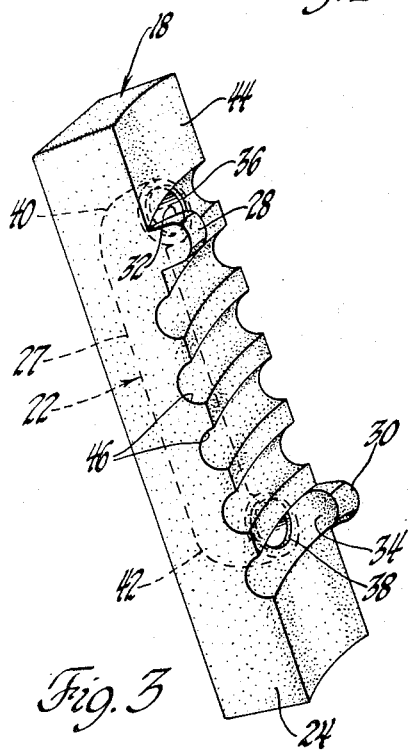
FIGURE 3 is an enlarged perspective view of the FIGURE 1 antifriction element return means.
Figure 2:
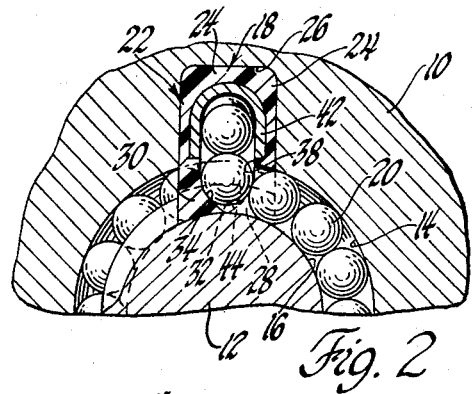
FIGURE 2 is a view taken on the line 2—2 in FIGURE 1.

The antifriction element return assembly 18 comprises a ball return tube 22 molded in place in a rectangular crossover block or guide element 24. The guide element 24 is made separately from nut member 10 and is free to slide in a longitudinal groove 26 in the internal wall of nut member 10 until held in a manner subsequently described. This guide element mounting locates the intermediate and straight return tube portion 27 parallel to the nut and screw axes. As best shown in FIGURES 2 and 3, guide element 24 is provided with integral deflector fingers 28 and 30 having their leading edges so disposed as to engage each of the oncoming balls well below their pitch diameter and near their point of engagement with the screw groove 16 so as to easily elevate and deflect them out of the raceway onto arcuate guide surfaces 32 and 34 provided on fingers 28 and 30 respectively. Guide surfaces 32 and 34 are curved to then direct the balls radially outward to enter circular passages 36 and 38 respectively provided in guide element 24. The opposite return tube ends 40 and 42 turn at right angles to the tube's longitudinal axis to connect with the short circular passages 36 and 38 respectively to provide for smooth flow of the balls from the radial path to the straight longitudinal path provided by intermediate tube portion 27 or vice versa depending upon the direction of ball circulation. Depending on the direction of ball circulation, the balls will thus be smoothly deposited or returned to the start of the raceway by the then downstream end of the return path.

The return tube 22 is made of a material having a higher melting point that the guide element 24 so that the guide element can be molded about the return tube. This is preferably accomplished by employing a steel tube and a bearing grade plastic such as Delrin for the guide element. It is to be understood, of course, that the term molded in place includes such encasing techniques as casting or the like using plastics or metals.

In the FIGURE 1 construction, the deflector fingers 28 and 30 are arcuately shaped for sliding contact with the bottom and sides of the screw groove 16 for guide element retention in the nut member 10, which retention will now be described. The inner side 44 of guide element 24 is provided with a radius equal to the bore or land radius of nut member 10 and also with helical grooves 46, which grooves follow the same helix as the raceway and provide continuity to the nut groove 14 and thus to the raceway. The grooves 46 are oversize compared with the nut groove 14 and thus the balls are temporarily unloaded as they course the grooves 46 during nut and screw operation. Since the balls occupying the nut and screw grooves 14 and 16 determine a positive connection between the nut and screw members, the sides and bottom of screw groove 16 by engagement with the deflector fingers 28 and 30 hold the guide element against longitudinal movement and seated in groove 26. Thus, the guide element 24 is fixed against movement relative to the nut member 10 and is not acted on by force tranmittal through the balls which would tend to wear the guide element grooves 46.

Figure 4:
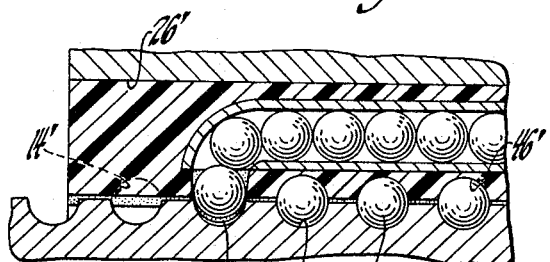
FIGURE 4 is a partial longitudinal view with parts in section showing another way of retaining the antifriction element return means on the nut.

Another way of providing guide element retention is shown in FIGURE 4 where like reference numerals are employed for identifying the corresponding parts shown in FIGURES 1, 2 and 3 but with the numerals appearing in FIGURE 4 being primed. In the FIGURE 4 structure, the guide element grooves 46' are the same size as nut groove 14'. The deflector fingers as shown by finger 28' are then provided with clearance in the screw groove 16' and the balls 20' by engagement with the guide element grooves 46' fix the guide element in position in groove 26' and relieve the deflector fingers of load.

In the structural arrangements shown, the balls are inserted into the endless circuit by rotating the screw until one of the deflector fingers is opened to the nut bore sufficiently to permit the feeding of the balls into the then open circuit. With the balls then inserted in the circuit, the screw is advanced to close the circuit to complete the assembly. Another way, other than the preferred way, of inserting the balls into the circuit is to introduce the balls via a passage through the nut member and guide element and into the return tube, which passage is closed after ball insertion.

While the present invention has been illustrated as being adapted for use in a ball nut and screw assembly, it will be understood that the invention is applicable to other assemblies, such as ball spline assemblies which have a pair of members movable relative to each other on antifriction elements guided by a traveling finite raceway and may be modified within the scope of the appended claims.

I claim:

1. An antifriction element return guide for recirculating a train of antifriction elements operating between a pair of relatively movable members comprising first means providing a passage for the antifriction elements and second means containing therein said first means providing smooth, curved entrances to the opposite ends of said passage for the antifriction elements.

2. An antifriction element return guide for recirculating a train of antifriction elements operating between a pair of relatively movable members comprising first means providing a through passage for the antifriction elements and second means wholly encasing said first means providing smooth, curved entrances to the opposite ends of said passage for the antifriction elements.

3. An antifriction element return guide for recirculating a train of antifriction elements operating between a pair of relatively movable members comprising first means providing a passage for the antifriction elements and second means wholly encasing said first means providing deflector fingers connected by smooth, curved entranceways to the opposite ends of said passage for deflecting the antifriction elements to and from said passage.

4. An antifriction element return guide for recirculating a train of antifriction elements operating between a pair of relatively movable members comprising first means, second means molded in place in said means providing a passage for the antifriction elements and said first means providing smooth, curved entrances to the opposite ends of said passage for the antifriction elements.

5. An antifriction element return guide for recirculating a train of antifriction elements operating between a pair of relatively movable concentrically arranged, cylindrical members comprising first means, second means molded in place in said first means providing an elongated passage having curved ends for the antifriction elements and said first means providing depending deflector fingers connected by smooth, curved entranceways to the curved ends of said passage for deflecting the antifriction elements to and from said passage.

6. An antifriction element return guide for recirculating a train of balls operating in complementary ball grooves in a pair of relatively movable members comprising guide means for connection to one of the members and being grooved at one side to complement the ball groove of the other member, an elongated tube molded in place in said guide means providing a circular passage of greater diameter than the balls and said guide means having depending deflector fingers at said one side arranged to project into the ball groove in the other member and connected by smooth, curved entranceways to the opposite ends of said passage for deflecting the balls to and from said passage.

7. An antifriction element return guide for recirculating a train of balls operating in complementary ball grooves in a pair of relatively movable, concentrically arranged cylindrical members comprising guide means for connection to one of the members and being grooved at one side to complement the ball groove of the other member, an elongated tube molded in place in said guide means having ends curved in the direction of the other member and providing a circular passage of greater diameter than the balls and said guide means having depending deflector fingers at said one side arranged to project past the pitch diameter of the balls and connected by smooth, curved entranceways to the opposite ends of said passage for deflecting the balls to and from said passage.

8. In combination, a first member, a second member, said members having complementary grooves defining a raceway, return means operatively connected to one of said members providing a return path for connecting the ends of said raceway to provide a continuous circuit, a train of antifricition elements mounted in said circuit and said return means including guide means, said return means further including passage means encased by said guide means providing a passage for the antifriction elements, said guide means having means for deflecting the antifriction elements to and from said passage, to and from said raceway.

9. In combination, a first member, a second member, said members having complementary ball grooves defining a raceway, return means operatively connected to one of said members for providing a ball return passage to connect the ends of said raceway to provide a continuous circuit, a train of balls mounted in said circuit and said return means comprising a guide element, a tube wholly encased in said guide element providing an intermediate portion of said return passage, said guide element having integral deflector means providing end portions of said return passage for deflecting the balls to and from said tube passage, to and from said raceway.

10. In combination, an inner member, an outer member encircling said inner member, said members having complementary ball grooves providing a raceway, return means operatively connected to one of said members for providing a ball return passage to connect the ends of said raceway to provide an endless ball circuit, a train of balls mounted in said circuit and said return means comprising a guide element, a tube molded in place in said guide element providing a passage for the balls, said guide element having means for deflecting the balls to and from said tube passage, to and from said raceway.

11. In combination, an inner member, an outer member encircling said inner member, said members having complementary helical ball grooves providing a helical raceway, return means operatively connected to one of said members for providing a ball return passage to connect the ends of said raceway to provide an endless ball circuit, a train of balls mounted in said circuit and said return means comprising a guide element, a tube molded in place in said guide element providing a passage for the balls, said guide element having deflector fingers projecting into said raceway connected by smooth, curved entranceways to the opposite ends of said tube passage for deflecting the balls to and from said tube passage, to and from said raceway.

12. In combination, an inner member, an outer member encircling said inner member, said members having complementary helical ball grooves providing a helical raceway, return means operatively connected to one of said members for providing a ball return passage to connect the ends of said raceway to provide an endless ball circuit, a train of balls mounted in said circuit and said return means comprising a guide element, a tube molded in place in said guide element providing a passage for the balls having end portions curved in the direction of the other member and an intermediate, elongated portion, said guide element having deflector fingers projecting into said raceway connected by smooth, curved guideways and then circular passageways to the opposite ends of said tube passage for deflecting the the balls to and from said tube passage, to and from said raceway.

13. In combination, an inner member, an outer member encircling said inner member, said members having complementary helical ball grooves defining lands and a helical raceway, return means operatively connected to one of said members for providing a ball return passage to connect the ends of said raceway to provide an endless ball circuit, a train of balls mounted in said circuit and said return means comprising a guide element mounted in an accommodating groove in the grooved surface of said one member, a tube molded in place in said guide element providing a passage for the balls having end portions curved in the direction of the other member and an intermediate portion extending parallel to the axis of said one member, said guide element having deflector fingers at one side projecting into said raceway connected by smooth, curved guideways and then circular passageways to the opposite ends of said tube passage for deflecting the balls to and from said tube passage, to and from said raceway, said one side of said guide element being curved to the radius of the land of said one member and being grooved to complement the ball groove of said other member.

14. In combination, an inner cylindrical member, an outer cylindrical member concentrically located about said inner member, said members having complementary helical ball grooves defining opposed lands and a helical raceway, return means for providing a ball return path to connect the ends of said raceway to provide a continuous ball circuit, a train of balls mounted in said circuit and said return means comprising a rectangularly shaped guide element mounted in an axially extending, rectangularly shaped groove in the grooved surface of one of said members, a tube molded in place in said guide element providing a passage for the balls having end portions curved in the direction of the other member and an intermediate, elongated portion extending parallel to the axis of said one member, said guide element having deflector fingers at one side projecting into said raceway past the pitch diameter of the balls and connected by smooth, curved guideways and then circular passageways to the opposite ends of said tube passage for deflecting the balls to and from said tube passage, to and from said raceway, said one side of said guide element being curved to the radius of the land of said one member and being grooved to complement the ball groove of said other member.

15. In combination, a first member, a second member, said members having complementary grooves defining a raceway, return means providing a return path for connecting the ends of said raceway to provide a continuous circuit, a train of antifriction elements mounted in said circuit, said return means including means operatively cooperating with one of said members to prevent movement of said return means in two mutually perpendicular directions relative to said one member and said return means further including retention means operatively cooperating with the other member to prevent movement of said return means in a third direction mutually perpendicular to the previously mentioned directions.

16. The combination set forth in claim 15 and said retention means being deflector fingers received in the groove of said other member for contact with said other member.

17. The combination set forth in claim 15 and said retention means including a groove to complement the groove of said other member to provide a portion of said raceway in which said antifriction elements contact said return means.

18. The combination set forth in claim 15 and said one member having a retention groove extending longitudinally of said one member and facing said other member, said return means mounted in said retention groove, the cooperating means of said return means being sides engaging the sides of said retention groove, said return means having a surface providing a portion of said raceway.

19. The combination set forth in claim 18 and said retention groove having a plurality of flat sides, the engaging sides of said cooperating means conforming to said flat retention groove sides, said retention means being a plurality of grooves intermediate the ends of said raceway complementing the groove of said other member to provide a portion of said raceway.

References Cited

UNITED STATES PATENTS

| | | | |
|---|---|---|---|
| 2,166,106 | 7/1939 | Gormley | 74—459 |
| 2,298,011 | 10/1942 | Hoffar | 74—459 |
| 2,425,938 | 8/1947 | Hoover | 74—459 |
| 2,756,608 | 7/1956 | Greenough | 74—459 |
| 3,234,810 | 2/1966 | Orner | 74—459 |

FOREIGN PATENTS 880,001  10/1961  Great Britain.

ROBERT M. WALKER, *Primary Examiner.*

DAVID J. WILLIAMOWSKY, *Examiner.*

L. H. GERIN, *Assistant Examiner.*